United States Patent

Lin

[11] Patent Number: 6,031,844
[45] Date of Patent: Feb. 29, 2000

[54] METHOD OF UPSTREAM MULTIPLE ACCESS CONTROL IN A TRANSMISSION SYSTEM

[75] Inventor: Ying-Dar Lin, Hsinchu, Taiwan

[73] Assignee: National Science Council, Taipei, Taiwan

[21] Appl. No.: 08/922,814

[22] Filed: Sep. 3, 1997

[30] Foreign Application Priority Data

Dec. 24, 1996 [TW] Taiwan ................................. 85115955

[51] Int. Cl.[7] .............................. H04L 12/28; H04J 3/26; H04Q 5/22
[52] U.S. Cl. ........................ 370/431; 370/431; 370/432; 370/437; 340/825.5; 340/825.07
[58] Field of Search .................................... 370/431, 432, 370/437, 442, 443, 444, 458, 508, 461, 462; 340/825.5, 825.07, 825.08

[56] References Cited

U.S. PATENT DOCUMENTS

| | | |
|---|---|---|
| 4,774,707 | 9/1988 | Raychaudhuri ............................ 370/95 |
| 5,570,355 | 10/1996 | Dail et al. ............................... 370/60.1 |
| 5,648,958 | 7/1997 | Counterman ............................. 370/458 |
| 5,787,483 | 7/1998 | Jam et al. ................................ 370/508 |
| 5,844,906 | 12/1998 | Khelghatti et al. ..................... 370/474 |
| 5,883,901 | 3/1999 | Chiu et al. .............................. 370/508 |

*Primary Examiner*—Michael Horabik
*Assistant Examiner*—Man Phan
*Attorney, Agent, or Firm*—Hitt, Chwang & Gaines, P.C.

[57] ABSTRACT

A method of upstream multiple access control in a transmission system is disclosed. The transmission system includes a headend, a plurality of stations and a tree-and-branch network communicating the stations with the headend, in which the stations transmit information to the headend via upstream channels and the headend transmit information to the stations via downstream channels. The method of the present invention is composed of three mechanisms, namely, station positioning, membership control, and transmission scheduling.

6 Claims, 2 Drawing Sheets

METHOD OF UPSTREAM MULTIPLE ACCESS CONTROL IN A TRANSMISSION SYSTEM

FIELD OF THE INVENTION

The present invention is related to a method and a protocol of upstream MAC (Multiple Access Control) in a transmission system, and in particular to a method and a protocol of upstream MAC for HFC (Hybrid Fiber Coax) having an upstream and downstream channels in a transmission system.

BACKGROUND OF THE INVENTION

Cable companies have become the leading players in the search for ways to expand the ATM-based NII (National Information Infrastrcucture) backbone network into the homes. However, the community networks must support two-way asymmetric traffic patterns and arbitrate multiple accesses for available bandwidth.

HFC is gradually becoming the standard for many cable companies. In order to support interactive information service, the conventional one-way transmission HFC network has been incorporated with optical fibers to become a two-way transmission optical-fiber-HFC mixed network. Further details of accomplishing the interactive multimedia service includes:

1. Establishing an optical fiber for a long distance transmission between the headend and a cluster of homes (HFC is still used for a short distance transmission between the cluster of homes and the terminal units).
2. Establishing upstream signal amplifiers on the network for the upstream channel between the headend and the terminal units.
3. Establishing an upstream MAC (Multiple Access Control) protocol in the controller of the headend.
4. Introducing an interactive multimedia service into the server of the headend, which is accessible to the terminal units.
5. Connecting the optical-fiber-HFC mixed network with the ATM-based NII backbone network.

The present invention is directed to an efficient upstream MAC (Multiple Access Control) protocol mentioned in the above item 3), which is also a goal to be achieved by IEEE 802.14 Cable TV LAN MAC/PHY committee. The conventional LAN protocols, for example CSMA/CD and R-ALOHA protocols, are not suitable for use in the case, because the optical-fiber-HFC mixed network has only the upstream and downstream channels. In optical-fiber-HFC mixed network the subscribers in the feeder cable can only listen to the downstream from the headend and transmit in the allocated upstream, and the headend, on the contrary, can only listen to the upstream from the subscribers and transmit in the downstream channel. The subscribers can not listen directly to the upstream transmissions from other subscribers, and hence they are incapable of coordinating their transmissions all by themselves. Moreover, many subscribers compete with one another in the upstream channel, so that the collision ratio under heavy traffic is high and thus inefficient.

Many MAC protocols have been proposed and studied. They can be classified into two categories: distributed protocols and centralized protocols. There is no central controller in the distributed protocols. The centralized protocols provide better timing mechanisms in avoiding collisions. This kind of protocols, proposed by many organizations, include MLAP(MAC Level Access Protocol) of IBM Corp. [Chatschik Bisdikian, Bill McNeil, Rob Norman and Ray Zeisz, "*MLAP: A MAC Level Access Protocol for the HFC 802.14 Network*", IEEE Communication Magazine, pp. 114–121, March 1996.], XDQRAP(Extended Distributed Queuing Random Access Protocol) of Scientific-Atlanta, Inc. [Frank Koperda, Bouchung Lin, "*First Phase Simulation for XDQRAP*", IEEE 802.14–96/062, draft proposal.], ADAPt (Adaptive Digital Access Protocol) of AT&T Bell Lab. [James E. Dail, Miguel A. Dajer, Chia-Chang Li, Peter D. Magill, Curtis A. Siller, Jr., Kotikalapudi Sriram, and Norman A. Whitaker, "*Adaptive Digital Access Protocol: A MAC Protocol for Multiservice Broadband Access Networks*", IEEE Communication Magazine, pp. 104–113, March 1996.], UniLINK protocol of LANcity corp. [John M. Ulm, LANcity Corp. "*A MAC proposal for 802.14*", IEEE 802.14/95–134, draft proposal.], FPP(Framed Pipeline Polling) protocol of NEC corp. [Morihisa momona, Shuntaro yamazaki, "*Framed Pipeline Polling for Cable TV Networks*", March 1995, IEEE 802.14–96/076, draft proposal.], CPR (Centralized Priority Reservation) protocol of Georgia Institute of Technology [Dolors Sala, John O. Limb, "*A Protocol for Efficient Transfer of Data over Fiber/Cable Systems*", pp. 904–911, IEEE INFOCOM'96.], and traditional TDMA (Time Division Multiple Access), etc.

In the centralized protocols proposed above, a fixed division approach is commonly utilized. The fixed division approach is more or less not compatible to a sudden change of information transmission, and thus can not reach the best throughput and utilization.

A main object of this invention is to provide an improved method of upstream multiple access control in a transmission system, and in particular in a optical-fiber-HFC mixed communication network, which has advantages of high efficiency and pipelined transmission.

SUMMARY OF THE INVENTION

In order to achieve the object of the present invention, a method of upstream multiple access control in a transmission system is disclosed. The transmission system includes a headend, a plurality of stations and a tree-and-branch network communicating said plurality of stations with said headend, in which said plurality of stations transmit information to said headend via upstream channels and said headend transmit information to said plurality of stations via downstream channels. The method accomplished in accordance with the present invention comprises carrying out the following steps a) and b) for every several cycles and carrying out the following step c) for every cycle in said headend associated with said plurality of stations:

a) updating on-line stations in said plurality of stations, and optionally balancing loads in all the upstream channels;

b) positioning said on-line stations according to transmission delays between said on-line stations and said headend and in an ascending order; and c) scheduling a transmission starting time and a transmission duration for each station of said on-line stations, which comprises calculations based on number of requested transmission cells and priority levels of the requested transmission cells provided by each of said on-line station to said headend at the end of its preceding transmission duration, and said transmission delay.

Preferably, said transmission duration in step c) is calculated in accordance with the following formula:

$$t_i = \begin{cases} (1) \text{ if } \sum(b_i + W_i) < CBT \\ \quad \max(b_i, 1) + W_i, \\ (2) \text{ if } \sum(b_i + W_i) > CBT \\ \quad \max\left(CBT \times \frac{\beta_i}{\sum \beta_i}, 1\right) + W_i, \\ (3) \text{ if } \sum(G_i + b_i + W_i) < CBT \\ \quad \max(G_i + b_i, 1) + W_i, \\ (4) \text{ if } \sum(g_i + b_i + W_i) < CBT < \sum(G_i + b_i + W_i) \\ \quad \max(g_i + b_i, 1) + W_i + \left((CBT - \sum(g_i + b_i)) \times \frac{(G_i - g_i)}{\sum(G_i - g_i)}\right), \\ (5) \text{ if } (CBT - \sum b_i) < \sum(g_i + W_i) < CBT \\ \quad \max\left((CBT - \sum(W_i + g_i)) \times \frac{\beta_i}{\sum \beta_i}, 1\right) + W_i + g_i, \\ (6) \text{ if } \sum(g_i + W_i) > CBT \\ \quad \max\left((CBT - \sum W_i) \times \frac{\alpha_i}{\sum \alpha_i}, 1\right) + W_i, \end{cases}$$

wherein i is the $i^{th}$ on-line station according to transmission delays between said on-line stations and said headend and in an ascending order;

$t_i$ is the transmission duration for the $i^{th}$ on-line station;

$b_i$ is a requested number of best-effort transmission cells of the $i^{th}$ on-line station;

$G_i$ is a requested number of guaranteed transmission cells of the $i^{th}$ on-line station;

$g_i$ a minimum number of guaranteed transmission cells of the $i^{th}$ on-line station;

$\alpha_i$ is urgency of guaranteed transmission cells of the $i^{th}$ on-line station;

$\beta_i$ is urgency of best-effort transmission cells of the $i^{th}$ on-line station;

CBT is the number of slots within a transmission cycle; and $W_i$ is a guard-band time overhead of the $i^{th}$ on-line station.

Preferably, the transmission starting time in step c) is calculated in accordance with the following formula:

$$s_i = \Sigma_{j=1}^{i-1} t_j - \tau_i$$

wherein i is defined as above;

j is an integer of 1 to i–1;

Si is the transmission starting time of the $i^{th}$ on-line station;

$t_j$ is the transmission duration for the $j^{th}$ on-line station; and $\tau_i$ is the transmission delay of the $i^{th}$ on-line station.

Preferably, said updating on-line stations in said plurality of stations in step a) comprises issuing an invitation frame from said headend to stations which are not on-line, and starting a tree walk algorithm [William Stallings, "*Handbook of Computer Communications Standards* vol. 2 *2nd. edition*", Howard W. Sams & Company, 1990.] between said headend and said not-on-line stations are not on-line which intend to be on-line.

Preferably, said positioning said on-line stations according to transmission delays between said on-line stations and said headend and in an ascending order in step b) comprises sending a position frame from said headend to each station of said on-line stations, which starts a timer for each transmitted position frame; upon receiving said position frame said each station modifying a special field thereof and throwing back the position frame to said headend immediately; and, computing a distance from said headend to said each station based on a difference of the times when the position frame is sent from and thrown back to said headend.

With station positioning and cyclic scheduling, the method of the present invention achieves a pipelined perfect transmission scheduling, which results in throughput over 98%. When the load is below 95%, the throughput for the method of the present invention is close to the theoretical bounds and no loss occurs.

DETAILED DESCRIPTION OF THE INVENTION

In order to span NII (National Information Infrastructure) into the homes, the community cable TV networks have to be re-engineered to support two-way interactive services. In the present invention, a PCUP (Pipelined Cyclic Upstream Protocol) as the upstream MAC (Multiple Access Control) protocol for HFC (Hybrid Fiber Coax) community access network is proposed. PCUP is designed with the intention of pipelining the upstream channel. This is achieved by proper station positioning, which measures the station propagation offset from the headend, and transmission scheduling, which assigns each station the transmission starting time and duration in a cycle. By taking into account the propagation offsets and the transmission times, transmitted cells can appear back-to-back, i.e. pipelined, at the headend. Since only the active stations are scheduled to transmit in a cycle, a membership control mechanism, which runs a contention-based tree walk algorithm, is executed periodically to allow the stations to join or leave.

SYSTEM OVERALL DESCRIPTION

Stations, each with a propagation delay from the headend, are scattered randomly over the HFC network. We can neutralize stations' propagation offsets by synchronizing them. The synchronization process, sorting the on-line stations according to their propagation offsets from the headend, is called station positioning. A membership control is done periodically to update the set of on-line stations and the channel usage status. An efficient transmission scheduling algorithm is then applied, in each cycle, to schedule the transmission starting time and duration of each station so that cells appear to be pipelined, i.e. back-to-back, at the headend. These three mechanisms, namely, station positioning, membership control, and transmission scheduling, constitute PCUP.

Figure 1:
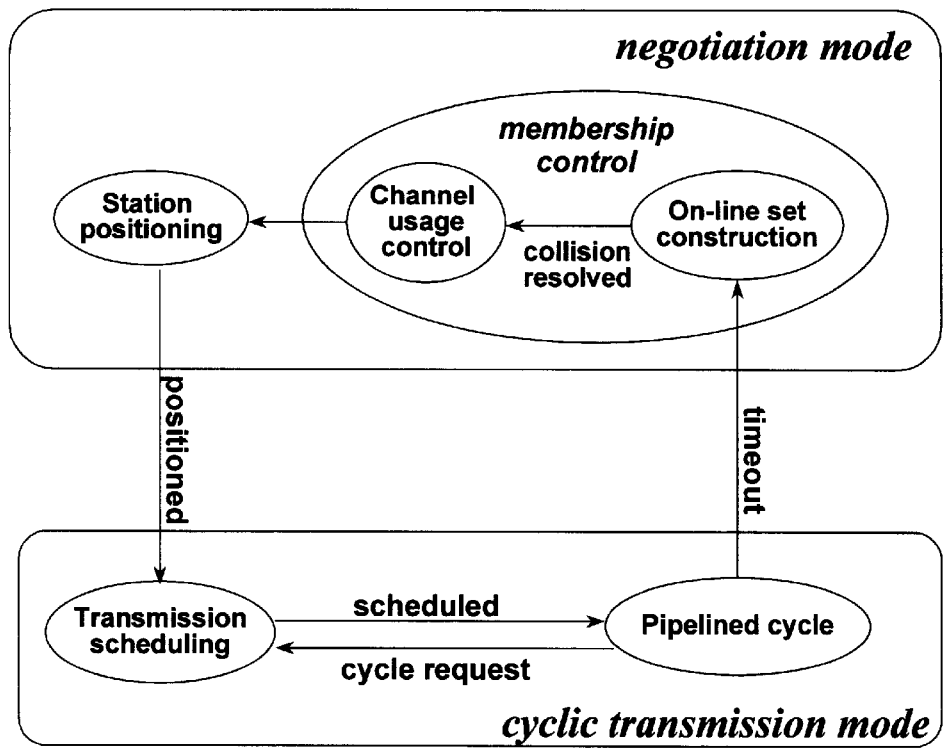
FIG. 1 is a block diagram showing the state transition of headend in the operation of the method of the present invention.

We divide the PCUP operations into two modes: cyclic transmission mode and negotiation mode as shown in FIG. 1. In FIG. 1, the condition to switch between the modes is triggered by a timer. PCUP runs a tree walk contention-based algorithm of the membership control in the negotiation mode so that stations may join, to be on-line, or leave, to be off-line, the PCUP operations. This process is essential in keeping the system status updated.

After the tree walk algorithm, stations that are in the PCUP operations are arranged, by the station positioning algorithm, as a sequence sorted by their propagation offsets from the headend. Stations are aligned by the headend in order to schedule their precise transmission starting times. The alignment can neutralize station's propagation offset so that cells arrive at the headend as though they were sent with zero propagation delay.

Figure 2:
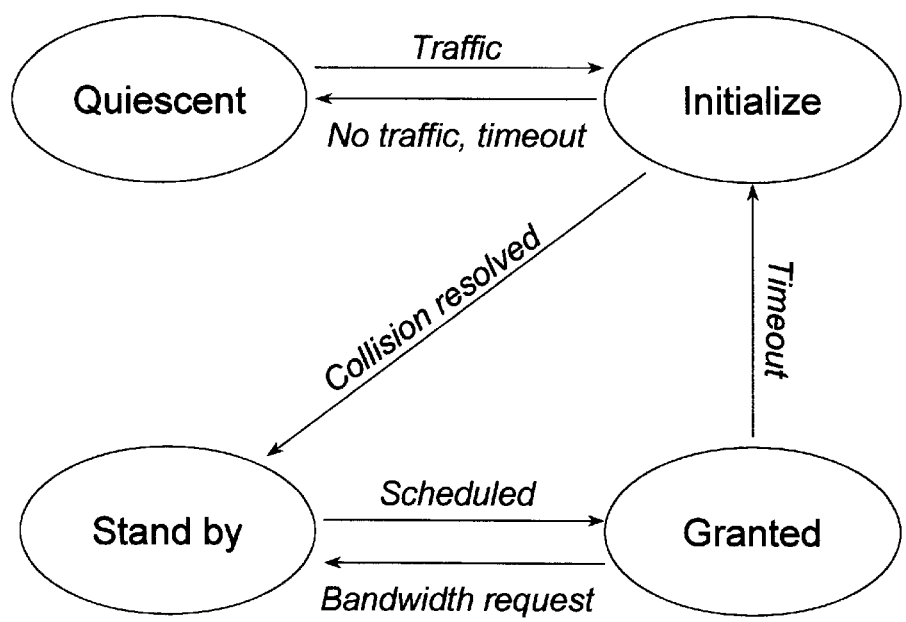
FIG. 2 is a state transition diagram of station in the operation of the method of the present invention.

While in the cyclic transmission mode, the PCUP runs a contention-free slotted mechanism within the upstream. After scheduling the transmission starting times, the headend assigns transmission slots for each station by an allocation frame according to the station's buffer queue size reported in the previous cycle. A slot time is sufficient for transmitting an ATM cell. All stations, upon receiving the allocation frame, can transmit its data in its assigned slots within the cycle, as illustrated in FIG. 2.

Membership Control

On-line Set Construction

The set of on-line stations is established by membership control in the negotiation mode, which is triggered by a timer, Group_Reset_Timer. The timer is set periodically to 0.3 second or more. The headend issues a HE.invitation frame to the stations that do not belong to the set, i.e. not in Request_Table[1] and starts a tree walk algorithm [William Stallings, *"Handbook of Computer Communications Standards* vol. 2 2nd edition", Howard W. Sams & Company, 1990.] to update the set of on-line stations. On-line stations which have not transmitted anything after the last membership control operation are considered off-line and will not receive the *HE.invitation frame.* The other on-line stations, which have transmitted something, As the complete run of tree walk algorithm is time-consuming, invitation procedure only invites those that are not the current on-line stations. will be still on-line with no need to send them the *HE. invitation frame.*

Channel usage control

There may be about 500 subscribers contending for 17 upstream channels. It is believed that fixed allocation, say assigning 30 subscribers to each channel, is a poor solution. If an upstream channel has more stations on-line, the allocated slots per station will be fewer and the time spent in negotiate mode may be longer. Thus, dynamic channel assignment in upstream is necessary in order to balance the channel utilization.

We have a field, *assigned_channel,* in *Request_Table* which records the assigned channel for each on-line station. The number of cells transmitted in a channel can be calculated by summing up the *num_cells* of the entries having the same *assigned_channel* in *Request_Table.* The headend can rearrange the assignments of stations channels to balance the load according to the number of transmitted cells in the channel. The headend sends a control frame, HE.balance, to the re-arranged stations to notify them which channels to switch to.

Station Positioning

One uniqueness of HFC is that stations can not listen directly to the upstream transmissions from the other stations; hence, they are incapable of detecting collisions and coordinating their transmissions all by themselves. What they can do is to listen and transmit on the downstream and allocated upstream, respectively.

Figure 3:
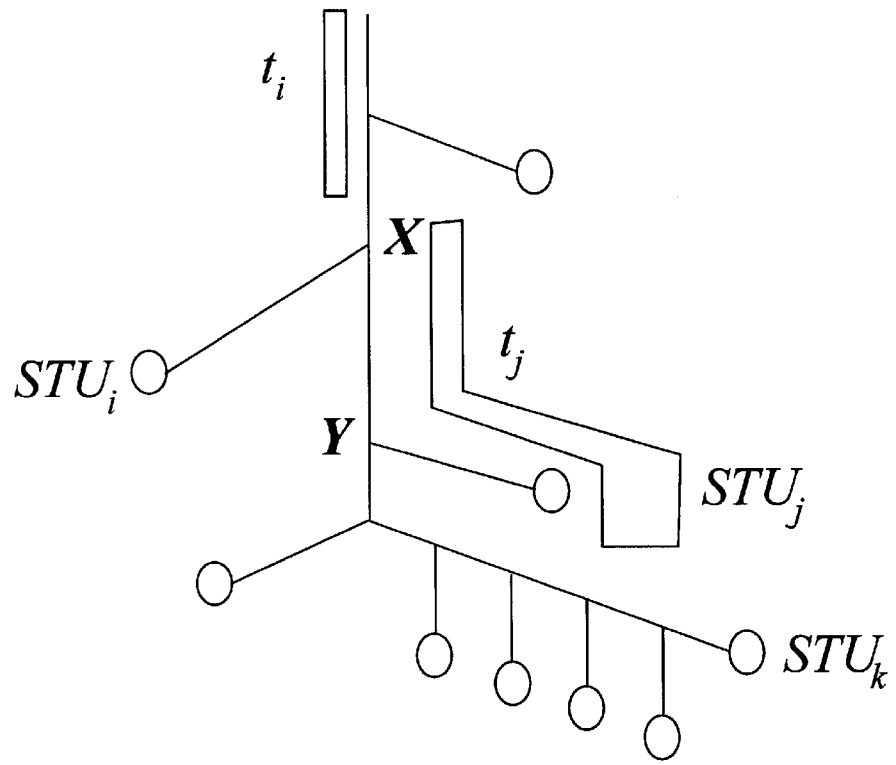
FIG. 3 is the tree-and-branch topology with data transmission, wherein $STU_i$ has transmitted, and the $STU_j$ is transmitting. $STU_j$ is the predecessor of $STU_k$ and the successor of $STU_i$.
Figure 4:
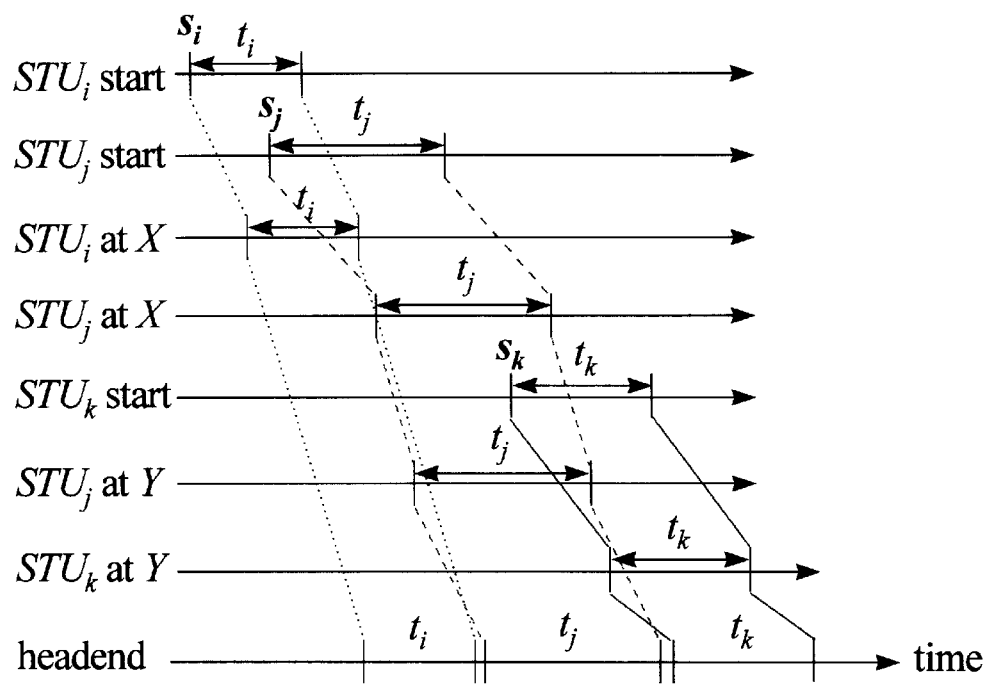
FIG. 4 is the example timeline of pipelined data transmission, wherein the convergence point of $STU_i$ and $STU_j$ is X; and the convergence point of $STU_j$ and $STU_k$ is Y. It can be seen from FIG. 4 that the successor starts its transmission before the end of its predecessor's transmission.

Our station positioning is the key to coordinate the stations' transmissions. It aims to neutralize station's propagation offset so that cells arrive at the headend as though they were sent with zero propagation delay. With the back-to-back transmission at the headend, the upstream channel will performs more efficiency without wasting. We explain the scheme by FIG. 3. In FIG. 3, X is the branching point of $STU_j$, and the difference of propagation delays between X to $STU_i$ and X to $STU_j$ is $\tau_{ij}$ ($\tau_{ij}=\tau_{jx}-\tau_{ix}$, where $\tau$ represents propagation delay). We can find out that the ideal situation at X can be modeled as $$s_i+t_i+G=s_j+\tau_{ij}, \quad (1)$$

where, $s_i$, i=1, 2, . . . N, is the transmission starting time of $STU_i$, $t_i$ is the allowed transmission duration for $STU_i$, G is the guard-band time between the consecutive data cells from different STUs. Scenario of this ideal situation is described in a clearer way by the timeline in FIG. 4. It is obvious that the headend needs to position the stations correctly in order to schedule transmissions in this way.

The station positioning algorithm starts at headend. Headend sends a *HE.position* frame to each station that has been included by the tree walk algorithm as on-line. It starts a timer for each transmitted HE.position. Upon receiving *HE.position,* the station modifies a special field, *check bit,* and throws back the *HE.position* frame immediately, either by hardware or firmware. Headend computes the *distance,* from the headend to the station, as $$\text{distance}=\lfloor(t_{rec}-t_{tx}-t_{overhead})\div 2\rfloor\times c \quad (2)$$

where $t_{rec}$ is the time headend receives the returned HE.position, $t_{tx}$ is the time headend transmits HE.position, $t_{overhead}$ is the transmission delay and possible processing delay, and c is the signal propagation speed. A 16-bits timing counter with units of 61 ns is sufficient for the CATV length specified by [IEEE 802.14, *"Cable TV MAC/PHY Protocol Working Group Functional Requirements"*, Oct. 19, 1994.]. Headend sorts these stations in the increasing order of the distance.

Transmission Scheduling

We are now ready to schedule the transmission starting time and duration of each station in this section. In order to help the headend to schedule the next cycle for the set of on-line stations, each station appends its buffer status, as requests shown in Table 1, at the end of its transmission duration.

TABLE 1

Station slot requests, appended in the final slot of its transmission

| Fields | Descriptions | Size (bytes) |
|---|---|---|
| $b_i$ | number of best-effort cells at STUi | 2 |
| $g_i/G_i$ | minimum/requested number of guaranteed cells at STUi | 2/2 |

TABLE 1-continued

Station slot requests, appended in the final slot of its transmission

| Fields | Descriptions | Size (bytes) |
|---|---|---|
| $\alpha_i/\beta_i$ | urgency of guaranteed/best-effort cells at $STU_i$ | 1/1 |

Requests have two priority levels in PCUP: best-effort and guaranteed. Slots are allocated according to the reported requests. Even if empty buffer is reported, headend allocates one slot to the station so that it can report its status in the coming cycle. If the required transmission time for the summation of the reported buffer queue lengths exceeds the Cycle_Time, it would allocate a proper number of slots according to the traffic urgency parameters ($\alpha_i$ and $\beta_i$). The headend allocates transmission quota, $t_i$, for station i, as described in equation 3. where CBT is the Cycle_Time and $W_i$ is the guard-band time overhead. The situations for these six cases are:

Case (1)

There is only best-effort traffic. Summation of all best-effort requests does not exceed the link capacity; thus, all of them can be served.

Case (2)

There is only best-effort traffic. Summation of all best-effort requests exceeds the link capacity; thus, these best-effort cells are served partially and proportionally according to their urgency parameters, $\beta_i$.

Case (3)

Summation of all best-effort and guaranteed services does not exceed the link capacity; thus, all of them can be served.

Case (4)

Summation of all best-effort cells and minimum guaranteed cells can be served. The left-over capacity is used to serve as many, up to $G_i$-$g_i$ for station i, guaranteed cells as possible.

Case (5)

Summation of all minimum guaranteed services is less than the link capacity, but the remaining capacity is not enough for all the best-effort cells. Thus, these best-efforts cells are served partially according to their urgency parameters, $\beta_i$. $\beta_i$ is used as the weight of station i in distributing the left-over capacity.

Case (6)

The case is the worst situation where the link capacity is less than the summation of minimum guaranteed services. Thus, the guaranteed cells are served partially by their urgency parameters, $\alpha_i$. $\alpha_i$, again, is used as the weight to distribute the capacity.

$$t_i = \begin{cases} (1) \text{ if } \sum(b_i + W_i) < CBT \\ \quad \max(b_i, 1) + W_i, \\ (2) \text{ if } \sum(b_i + W_i) > CBT \\ \quad \max\left(CBT \times \frac{\beta_i}{\sum \beta_i}, 1\right) + W_i, \\ (3) \text{ if } \sum(G_i + b_i + W_i) < CBT \\ \quad \max(G_i + b_i, 1) + W_i, \\ (4) \text{ if } \sum(g_i + b_i + W_i) < CBT < \sum(G_i + b_i + W_i) \\ \quad \max(g_i + b_i, 1) + W_i + \left((CBT - \sum(g_i + b_i)) \times \frac{(G_i - g_i)}{\sum(G_i - g_i)}\right), \\ (5) \text{ if } (CBT - \sum b_i) < \sum(g_i + W_i) < CBT \\ \quad \max\left((CBT - \sum(W_i + g_i)) \times \frac{\beta_i}{\sum \beta_i}, 1\right) + W_i + g_i, \\ (6) \text{ if } \sum(g_i + W_i) > CBT \\ \quad \max\left((CBT - \sum W_i) \times \frac{\alpha_i}{\sum \alpha_i}, 1\right) + W_i, \end{cases} \quad (3)$$

After that, the headend then computes the transmission starting time, $s_i$, precisely as follows:

$$s_i = \Sigma_{j=1}^{i-1} t_j^{-\tau} i \quad (4)$$

Then, headend can assign a proper starting time and transmission duration time by the allocation frame, HE.schedule.

Note that with the possible long propagation delay, the headend may need to pre-allocate the HE.schedule frame several cycles ahead. The amount of this look-ahead has to be larger than the longest propagation delay. Since the propagation delay is usually small compared to the cycle time, 323 μs vs. 50 ms in some of our simulations, we need to look ahead only one cycle in most cases.

Conclusion

PCUP's performance is contributed by several features: 1) a membership control which periodically updates the set of on-line stations and the channel usage status, 2) a synchronization process which neutralizes stations' propagation offsets, and 3) an efficient transmission scheduling algorithm to schedule, in each cycle, the transmission starting time and duration of each station so that cells appear to be pipelined, i.e. back-to-back, at the headend.

What is claimed is:

1. A method of upstream multiple access control in a transmission system, said transmission system comprising a headend, a plurality of stations and a tree-and-branch network communicating said plurality of stations with said headend, in which said plurality of stations transmit information to said headend via upstream channels and said headend transmit information to said plurality of stations via downstream channels, said method comprising carrying out the following steps a) and b) for every several cycles and carrying out the following step c) for every cycle in said headend associated with said plurality of stations:

a) updating on-line stations in said plurality of stations, and optionally balancing loads in all the upstream channels;

b) positioning said on-line stations according to transmission delays between said on-line stations and said headend and in an ascending order; and c) scheduling a transmission starting time and a transmission duration for each station of said on-line stations, which comprises calculations based on number of requested transmission cells and priority levels of the requested transmission cells provided by each of said on-line station to said headend at the end of its preceding transmission duration, and said transmission delay, said transmission duration calculated in accordance with the following formula:

$$t_i = \begin{cases} (1) \text{ if } \sum (b_i + W_i) < CBT \\ \quad \max(b, 1) + W_i, \\ (2) \text{ if } \sum (b_i + W_i) > CBT \\ \quad \max\left(CBT \times \frac{\beta_i}{\sum \beta_i}, 1\right) + W_i, \\ (3) \text{ if } \sum (G_i + b_i + W_i) < CBT \\ \quad \max(G_i + b_i, 1) + W_i, \\ (4) \text{ if } \sum (g_i + b_i + W_i) < CBT < \sum (G_i + b_i + W_i) < CBT \\ \quad \max(g_i + b_i, 1) + W_i + \left((CBT - \sum (g_i + b_i)) \times \frac{(G_i - g_i)}{\sum (G_i - g_i)}\right), \\ (5) \text{ if } (CBT - \sum b_i) < \sum (g_i + W_i) < CBT \\ \quad \max\left((CBT - \sum (W_i + g_i)) \times \frac{\beta_i}{\sum \beta_i}, 1\right) + W_i + g_i, \\ (6) \text{ if } \sum (g_i + W_i) > CBT \\ \quad \max\left((CBT - \sum W_i) \times \frac{\alpha_i}{\sum \alpha_i}, 1\right) + W_i, \end{cases}$$

wherein
i is the $i^{th}$ on-line station according to transmission delays between said on-line stations and said headend and in an ascending order;
$t_i$ is the transmission duration for the $i^{th}$ on-line station;
$b_i$ is a requested number of best-effort transmission cells of the $i^{th}$ on-line station;
$G_i$ is a requested number of guaranteed transmission cells of the $i^{th}$ on-line station;
$g_i$ is a minimum number of guaranteed transmission cells of the $i^{th}$ on-line station;
$\alpha_i$ is urgency of guaranteed transmission cells of the $i^{th}$ on-line station;
$\beta_i$ is urgency of best-effort transmission cells of the $i^{th}$ on-line station;
CBT is the number of slots within a transmission cycle; and
$W_i$ is a guard-band time overhead of the $i^{th}$ on-line station.

2. A method of upstream multiple access control in a transmission system, said transmission system comprising a headend, a plurality of stations and a tree-and-branch network communicating said plurality of stations with said headend, in which said plurality of stations transmit information to said headend via upstream channels and said headend transmit information to said plurality of stations via downstream channels, said method comprising carrying out the following steps a) and b) for every several cycles and carrying out the following step c) for every cycle in said headend associated with said plurality of stations:
  a) updating on-line stations in said plurality of stations, and optionally balancing loads in all the upstream channels;
  b) positioning said on-line stations according to transmission delays between said on-line stations and said headend and in an ascending order; and
  c) scheduling a transmission starting time and a transmission duration for each station of said on-line stations, which comprises calculations based on number of requested transmission cells and priority levels of the requested transmission cells provided by each of said on-line station to said headend at the end of its preceding transmission duration, and said transmission delay, said transmission duration calculated in accordance with the following formula:

$$S_i = \sum_{j=1}^{i-1} t_j - \tau_i$$

wherein
i is the $i^{th}$ on-line station according to transmission delays between said on-line stations and said headend and in an ascending order;
j is an integer of 1 to i–1
$S_i$ is the transmission starting time of the $i^{th}$ on-line station;
$t_j$ is the transmission duration for the $j^{th}$ on-line station; and
$\tau_i$ is the transmission delay of the $i^{th}$ on-line station.

3. The method according to claim 1, wherein said updating on-line stations in said plurality of stations in step a) comprises issuing an invitation frame from said headend to stations which are not on-line, and starting a tree walk algorithm between said headend and said not-on-line stations are not on-line which intend to be on-line.

4. A method of upstream multiple access control in a transmission system, said transmission system comprising a headend, a plurality of stations and a tree-and-branch network communicating said plurality of stations with said headend, in which said plurality of stations transmit information to said headend via upstream channels and said headend transmit information to said plurality of stations via downstream channels, said method comprising carrying out the following steps a) and b) for every several cycles and carrying out the following step c) for every cycle in said headend associated with said plurality of stations:
  a) updating on-line stations in said plurality of stations, and optionally balancing loads in all the upstream channels;
  b) positioning said on-line stations according to transmission delays between said on-line stations and said headend and in an ascending order; and
  c) scheduling a transmission starting time and a transmission duration for each station of said on-line stations, which comprises calculations based on number of requested transmission cells and priority levels of the requested transmission cells provided by each of said on-line station to said headend at the end of its preceding transmission duration, and said transmission delay wherein said positioning said on-line stations according to transmission delays between said on-line stations and said headend and in an ascending order in step b) comprises sending a position frame from said headend to each station of said on-line stations, which starts a timer for each transmitted position frame; upon receiving said position frame said each station modifying a special field thereof and throwing back the position frame to said headend immediately; and, computing a distance from said headend to said each station based on a difference of times when the position frame is sent from and thrown back to said headend.

5. The method according to claim 2, wherein said updating on-line stations in said plurality of stations in step a) comprises issuing an invitation frame from said headend to stations which are not on-line, and starting a tree walk algorithm between said headend and said not-on-line stations are not on-line which intend to be on-line.

6. The method according to claim 4, wherein said updating on-line stations in said plurality of stations in step a) comprises issuing an invitation frame from said headend to stations which are not on-line, and starting a tree walk algorithm between said headend and said not-on-line stations are not on-line which intend to be on-line.

* * * * *

UNITED STATES PATENT AND TRADEMARK OFFICE
CERTIFICATE OF CORRECTION

PATENT NO. : 6,031,844
DATED : February 29, 2000
INVENTOR(S) : Ying-Dar Lin

It is certified that error appears in the above-identified patent and that said Letters Patent is hereby corrected as shown below:

Column 5,
Line 44, "As the complete run of tree walk algorithm is time-consuming, invitation procedure only invites those that are not the current on-line stations." should be deleted.

Signed and Sealed this

Fifth Day of February, 2002

Attest:

JAMES E. ROGAN
Attesting Officer *Director of the United States Patent and Trademark Office*